United States Patent
Cui et al.

(10) Patent No.: US 8,965,205 B2
(45) Date of Patent: *Feb. 24, 2015

(54) METHODS AND APPARATUS TO DEPLOY FIBER OPTIC BASED ACCESS NETWORKS

(71) Applicant: AT&T Intellectual Property I, L.P., Atlanta, GA (US)

(72) Inventors: Zhi Cui, Marietta, GA (US); Thomas Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,996

(22) Filed: Sep. 19, 2013

(65) Prior Publication Data
US 2014/0016936 A1  Jan. 16, 2014

Related U.S. Application Data

(63) Continuation of application No. 13/619,515, filed on Sep. 14, 2012, now Pat. No. 8,582,971, which is a continuation of application No. 12/268,209, filed on Nov. 10, 2008, now Pat. No. 8,275,262.

(51) Int. Cl.
*H04J 14/00* (2006.01)
*H04J 14/02* (2006.01)
(Continued)

(52) U.S. Cl.
CPC .............. *H04B 10/27* (2013.01); *H04B 10/278* (2013.01); *H04J 14/028* (2013.01)
USPC ............... 398/66; 398/83; 370/420; 370/430; 370/396; 385/24

(58) Field of Classification Search
USPC ............. 398/43, 66, 67, 79, 82–85, 139, 183; 370/420, 430, 493; 385/16, 17, 24, 39
See application file for complete search history.

(56) References Cited

U.S. PATENT DOCUMENTS

| 4,540,846 A | 9/1985 | Smith |
| 4,768,188 A | 8/1988 | Barnhart et al. |

(Continued)

FOREIGN PATENT DOCUMENTS

| CN | 101001120 | 7/2007 |
| EP | 1018851 | 12/2000 |

(Continued)

OTHER PUBLICATIONS

Hui, Rongqing et al., "Subcarrier Multiplexing for High-Speed Optical Transmission," Journal of Lightwave Technology, vol. 20, No. 3, Mar. 2002, pp. 417-427 (11 pages).

(Continued)

*Primary Examiner* — Loha Ben
(74) *Attorney, Agent, or Firm* — Hanley, Flight & Zimmerman, LLC

(57) ABSTRACT

Methods and apparatus to deploy fiber optic based access networks are disclosed. An example access network comprises a first fiber optic cable segment to couple an optical access head-end to a first pedestal and to transport user data, a second fiber optic cable segment to couple the first pedestal to a second pedestal and to transport a first portion of the user data to the second pedestal, a drop cable segment to couple the first pedestal to a customer premises and to transport a second portion of the user data to the customer premises, and a switch at the first pedestal to route the first portion of the user data between the first and second fiber optic cable segments and to route the second portion of the user data between the first fiber optic cable segment and the drop cable segment.

5 Claims, 4 Drawing Sheets

(51) Int. Cl.
*H04L 12/28* (2006.01)
*H04B 10/27* (2013.01)
*H04B 10/278* (2013.01)

(56) References Cited

U.S. PATENT DOCUMENTS

| | | | |
|---|---|---|---|
| 5,150,246 | A | 9/1992 | Kimball et al. |
| 5,185,736 | A | 2/1993 | Tyrrell et al. |
| 5,517,489 | A | 5/1996 | Ogura |
| 5,523,869 | A | 6/1996 | Still et al. |
| 5,619,498 | A * | 4/1997 | Sharpe .................... 370/396 |
| 5,699,176 | A | 12/1997 | Cohen |
| 5,717,795 | A | 2/1998 | Sharma et al. |
| 5,729,370 | A | 3/1998 | Bernstein et al. |
| 5,767,999 | A | 6/1998 | Kayner |
| 5,793,410 | A | 8/1998 | Rao |
| 5,879,173 | A | 3/1999 | Poplawski et al. |
| 5,880,864 | A | 3/1999 | Williams et al. |
| 5,903,558 | A | 5/1999 | Jones et al. |
| 6,026,144 | A | 2/2000 | Bernstein et al. |
| 6,031,300 | A | 2/2000 | Moran |
| 6,160,946 | A | 12/2000 | Thompson et al. |
| 6,241,920 | B1 | 6/2001 | Cotter et al. |
| 6,253,235 | B1 | 6/2001 | Estes |
| 6,289,148 | B1 | 9/2001 | Lin et al. |
| 6,362,908 | B1 | 3/2002 | Kimbrough et al. |
| 6,374,307 | B1 | 4/2002 | Ristau et al. |
| 6,385,030 | B1 | 5/2002 | Beene |
| 6,389,030 | B1 | 5/2002 | Coden |
| 6,427,035 | B1 | 7/2002 | Mahony |
| 6,431,765 | B1 | 8/2002 | Chen et al. |
| 6,445,472 | B1 | 9/2002 | Kim et al. |
| 6,454,597 | B1 | 9/2002 | Marsh et al. |
| 6,577,414 | B1 | 6/2003 | Feldman et al. |
| 6,665,319 | B1 | 12/2003 | Bergaire et al. |
| 6,684,030 | B1 | 1/2004 | Taylor et al. |
| 6,738,983 | B1 | 5/2004 | Rao et al. |
| 6,785,265 | B2 | 8/2004 | White et al. |
| 6,842,845 | B2 | 1/2005 | Ganapathy et al. |
| 6,886,181 | B1 | 4/2005 | Dodds et al. |
| 6,895,185 | B1 | 5/2005 | Chung et al. |
| 6,931,003 | B2 | 8/2005 | Anderson |
| 6,947,670 | B1 | 9/2005 | Korotky et al. |
| 6,980,725 | B1 | 12/2005 | Swieconek |
| 7,006,497 | B2 | 2/2006 | Dove et al. |
| 7,007,297 | B1 | 2/2006 | Woodward |
| 7,095,958 | B1 | 8/2006 | Woodward |
| 7,133,441 | B1 | 11/2006 | Barlev et al. |
| 7,139,484 | B2 | 11/2006 | Kurumida et al. |
| 7,274,881 | B2 | 9/2007 | Hochbaum |
| 7,278,152 | B1 | 10/2007 | Rao |
| 7,278,158 | B2 | 10/2007 | Peretti |
| 7,356,042 | B2 | 4/2008 | Ethridge et al. |
| 7,366,203 | B2 | 4/2008 | Deas |
| 7,376,191 | B2 | 5/2008 | Melick et al. |
| 7,453,929 | B2 | 11/2008 | Barlev et al. |
| 7,599,620 | B2 | 10/2009 | Graves et al. |
| 7,805,072 | B2 | 9/2010 | Lovisa et al. |
| 7,933,285 | B2 * | 4/2011 | Anschutz et al. ............ 370/420 |
| 2001/0037442 | A1 | 11/2001 | Ganapathy et al. |
| 2002/0181475 | A1 | 12/2002 | Dove et al. |
| 2003/0185567 | A1 | 10/2003 | Kurumida et al. |
| 2003/0200549 | A1 | 10/2003 | Rao et al. |
| 2004/0076166 | A1 | 4/2004 | Patenaude |
| 2004/0165889 | A1 | 8/2004 | Mahony et al. |
| 2004/0175173 | A1 | 9/2004 | Deas |
| 2004/0264683 | A1 | 12/2004 | Bye |
| 2005/0152385 | A1 | 7/2005 | Cioffi |
| 2005/0213974 | A1 | 9/2005 | Deas |
| 2006/0077891 | A1 | 4/2006 | Smith et al. |
| 2006/0153517 | A1 | 7/2006 | Reagan et al. |
| 2006/0153565 | A1 | 7/2006 | Park et al. |
| 2006/0171714 | A1 | 8/2006 | Dove |
| 2006/0251094 | A1 | 11/2006 | Van Vleck et al. |
| 2006/0269291 | A1 | 11/2006 | Kagawa et al. |
| 2006/0275036 | A1 | 12/2006 | Hochbaum et al. |
| 2007/0019956 | A1 | 1/2007 | Sorin et al. |
| 2007/0230955 | A1 | 10/2007 | Miller et al. |
| 2008/0011990 | A1 | 1/2008 | Kostet et al. |
| 2008/0019501 | A1 | 1/2008 | Miller, III et al. |
| 2008/0046938 | A9 | 2/2008 | Rao et al. |
| 2008/0063399 | A1 | 3/2008 | Mallya et al. |
| 2008/0069004 | A1 | 3/2008 | Huff |
| 2008/0193130 | A1 | 8/2008 | Chae et al. |
| 2008/0253769 | A1 | 10/2008 | Liu |
| 2008/0290729 | A1 | 11/2008 | Schoenberg et al. |
| 2009/0010657 | A1 | 1/2009 | Kazutaka |
| 2009/0212971 | A1 | 8/2009 | Casey et al. |
| 2009/0262912 | A1 | 10/2009 | Bremer et al. |
| 2010/0103947 | A1 | 4/2010 | Anschutz et al. |
| 2010/0119235 | A1 | 5/2010 | Cui et al. |

FOREIGN PATENT DOCUMENTS

| | | |
|---|---|---|
| JP | 2007295506 | 11/2007 |
| KR | 713062 | 4/2007 |
| WO | 2008007884 | 1/2008 |

OTHER PUBLICATIONS

Reconfigurable Optical Add-Drop Multiplexer, Wikipedia web page http://en.wikipedia.org/wiki/Reconfigurable_optical_add-drop_multiplexer, Oct. 13, 2008, 1 page.

Extending Asymmetric Digital Subscriber Line (ADSL) Services to Remote Digital Loop Carrier (DLC) Locations, Web ProForums, web page http://www.iec.org/online/tutorials/adsl_dlc/topic04.html, Copyright 2007, printed Oct. 15, 2008, 2 pages.

Passive Optical Network, Wikipedia web page http://en.wikipedia.org/wiki/Passive_optical_network, Oct. 14, 2008, 7 pages.

James Blanc, Pedestal Networks, Inc., Line Powering in the Remote DSLAM World, CommsDesign, Dec. 7, 2004, 9 pages.

Optical add-drop multiplexer, Wikipedia web page http://en.wikipedia.org/wiki/Optical_add-drop_multiplexer, Jan. 31, 2008, 2 pages.

Cioffi et al., CuPon: The Copper Alternative to PON 100 Gb/s DSL Networks, IEEE Communications Magazine, Jun. 2007, 8 pages.

Fiber to the X, Wikipedia web page http://en.wikipedia.org/wiki/Fiber_to_the_x, Oct. 14, 2008, 8 pages.

Dynamic Spectrum Management (DSM): Level 3—Vectoring for multi-100 Mbps DSLs, Birds of a Feather Session, DSL Forum, Speaker John M. Cioffi, Aug. 28, 2007, 18 pages.

United States Patent and Trademark Office, "Non-Final Office Action," issued in connection with U.S. Appl. No. 13/619,515, on Feb. 13, 2013, 6 pages.

United States Patent and Trademark Office, "Notice of Allowance," issued in connection with U.S. Appl. No. 13/619,515, on Jun. 19, 2013, 16 pages.

United States Patent and Trademark Office, "*Ex parte Quayle Action*," issued in connection with U.S. Appl. No. 12/268,209, on Nov. 23, 2011, 7 pages.

United States Patent and Trademark Office, "Notice of Allowance," issued in connection with U.S. Appl. No. 12/268,209, on Mar. 26, 2012, 8 pages.

* cited by examiner

METHODS AND APPARATUS TO DEPLOY FIBER OPTIC BASED ACCESS NETWORKS

PRIORITY APPLICATION

This patent arises from a continuation of U.S. patent application Ser. No. 13/619,515, filed on Sep. 14, 2012, entitled "METHODS AND APPARATUS TO DEPLOY FIBER OPTIC BASED ACCESS NETWORKS," now U.S. Pat. No. 8,582,971, which arises from a continuation of U.S. patent application Ser. No. 12/268,209, now U.S. Pat. No. 8,275,262, filed on Nov. 10, 2008, entitled "METHODS AND APPARATUS TO DEPLOY FIBER OPTIC BASED ACCESS NETWORKS," both of which are hereby incorporated herein by reference in their entireties.

FIELD OF THE DISCLOSURE

This disclosure relates generally to access networks and, more particularly, to methods and apparatus to deploy fiber optic based access networks.

BACKGROUND

Communication systems using fiber optic technologies are commonly utilized to provide high data rate communication services to customer premises. In some examples, a communication company and/or service provider installs a fiber optic cable between a central office (CO), a remote terminal (RT) or a serving area interface (SAI) and a customer premises to provide communication services to the customer premises. In other examples, a single fiber optic cable installed between a CO, RT or SAI and a pedestal is used to provide communication services from the pedestal to one or more customer premises.

DETAILED DESCRIPTION

Figure 1:
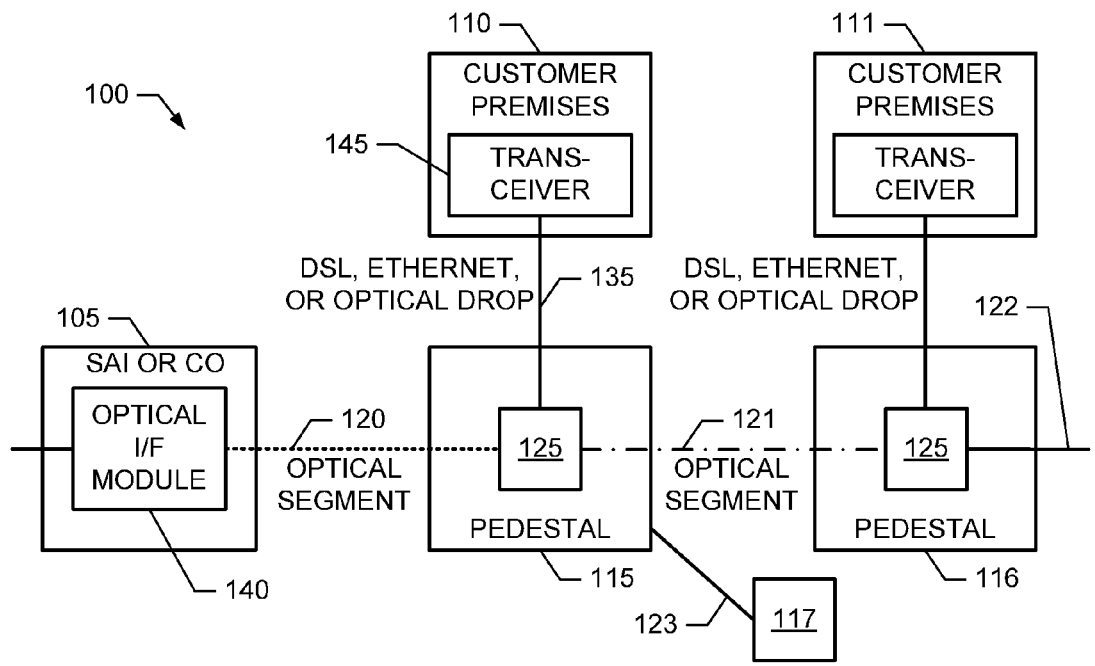
FIG. 1 is a schematic illustration of an example fiber optic based access network constructed in accordance with the teachings of this disclosure.

Example methods and apparatus to deploy fiber optic based access networks in brown field environments are disclosed. A disclosed example access network includes a first fiber optic cable segment to couple an optical access head-end to a first pedestal, the first fiber optic cable segment to transport user data associated with a plurality of subscribers served by the optical access head-end, a second fiber optic cable segment to couple the first pedestal to a second pedestal, the second fiber optic cable segment to transport a first portion of the user data associated with a first of the plurality of subscribers from the first pedestal to the second pedestal, the second fiber optic cable segment different from the first fiber optic cable segment, a drop cable segment to couple the first pedestal to a customer premises, the drop cable segment to transport a second portion of the user data associated with a second of the plurality of subscribers to the customer premises, the drop cable segment different from the first and second fiber optic cable segments, and a switch at the first pedestal to route the first portion of the user data between the first and second fiber optic cable segments and to route the second portion of the user data between the first fiber optic cable segment and the drop cable segment.

Another disclosed example access network includes an optical access head-end to implement communication services for respective ones of a plurality of subscribers, a first pedestal and a second pedestal. The first pedestal including a first communication interface module to communicatively couple the first pedestal to the optical access head-end via a first fiber optic cable segment, the first fiber optic cable segment to transport user data associated with the plurality of subscribers served by the optical access head-end, a second communication interface module to communicatively couple the first pedestal to a second fiber optic cable segment, the second fiber optic cable segment to transport a first portion of the user data, a third communication interface module to communicatively couple the first pedestal to a first customer premises and to transport a second portion of the user data associated with a first of the plurality of subscribers to the first customer premises, and a first switch to route the first portion of the user data between the first and second communication interface modules and to route the second portion of the user data between the first and third communication interface modules. The second pedestal including a fourth communication interface module to communicatively couple the first pedestal to the second pedestal via the second fiber optic cable segment, a fifth communication interface module to communicatively couple the second pedestal to a second customer premises and to transport a third portion of the user data associated with a second of the plurality of subscribers to the second customer premises, the second portion of the user data comprising the third portion of the user data, and a second switch to route the third portion of the user data between the fourth and fifth communication interface modules.

A disclosed example method to deploy a fiber optic based access network in a brown field environment includes receiving a first request for a first communication service to a first customer premises, installing a first fiber optic cable segment between an optical access head-end and a first pedestal associated with the first customer premises, the first fiber optic cable segment routed through a second pedestal geographically located between the optical access head-end and the first pedestal, installing a first distributor at the first pedestal to route first data between the first fiber optic cable segment and the first customer premises, receiving a second request for a second communication service to a second customer premises associated with the second pedestal, the second request received subsequent to the installation of the first fiber optic cable segment and the first distributor, splitting the first fiber optic cable segment at the second pedestal to form second and third fiber optic cable segments, and installing a second distributor at the second pedestal between the second and third fiber optic cable segments, the second distributor to route second data between the second fiber optic cable segment, the third fiber optic cable segment and the second customer premises.

A disclosed example apparatus includes a first interface module at a first pedestal to receive user data associated with a plurality of subscribers served by an optical access head-end via a first fiber optic cable segment, a second interface module at the first pedestal to transport a first portion of the user data to a second pedestal via a second fiber optic cable segment, the second fiber optic cable segment different from the first fiber optic cable segment, a third interface module at the first pedestal to transport a second portion of the user data associated with a first of the plurality of subscribers to a customer premises, and a switch at the first pedestal to route the first portion of the user data between the first and second communication interface modules and to route the second portion of the user data between the first and third communication interface modules.

FIG. 1 illustrates an example fiber optic based access network 100. In the illustrated example of FIG. 1, an optical access head-end, such as a serving area interface (SAI) 105, a remote terminal (RT) or a central office (CO), provides and/or implements communication services for one or more customer premises, two of which are designated at reference numerals 110 and 111. Example services include, but are not limited to, telephone services, Internet-based services, data services, messaging services, instant messaging services, electronic mail (email) services, chat services, video services, video on demand services, audio services, and/or gaming services. While for ease of discussion the following examples are described with reference to the example SAI 105, it will be understood that any type of optical access head-end could be used including, but not limited to, an RT or a CO.

The example SAI 105 of FIG. 1 provides the services to the example customer premises 110 and 111 via any number of interposed pedestals or aerial terminals, two of which are designated at reference numerals 115 and 116. To implement the example access network 100, the example SAI 105, the example pedestal 115 and the example pedestal 116 of FIG. 1 are configured in a daisy-chain topology. In particular, a first fiber optic cable segment 120 is used to communicatively couple the example SAI 105 to the example pedestal 115, and a second fiber optic cable segment 121 is used to communicatively couple the example pedestal 115 to the example pedestal 116, and a third fiber optic cable segment 122 is used to communicatively couple the example pedestal 116 to another pedestal (not shown). The example fiber optic cable segments 120-122 of FIG. 1 are disjoint segments and/or portions of fiber optic cable, which collectively communicatively couple the SAI 105 to each of the pedestals 115 and 116. The example fiber optic cable segment 120 of FIG. 1 transports user data associated with all of the subscribers served by the pedestals 115 and 116. The example fiber optic cable segment 121 of FIG. 1 transports user data associated with all of the subscribers served by the pedestal 116 and any additional pedestals. The example fiber optic cable segment 122 of FIG. 1 transports user data associated with all of the subscribers served by any additional pedestals served by the SAI 105 via the fiber optic cable segment 120. The example fiber optic cable segments 120-122 of FIG. 1 may be any number and/or type(s) of fiber optic cables. Example types of fiber optic cables include, but are not limited to, single-mode fiber, multi-mode fiber, multiple wavelength (λ) fiber, and/or cables that include more than one fiber. In some examples, a pedestal (for example, the pedestal 115) may be communicatively coupled to one or more additional pedestals, one of which is designated at reference numeral 117 via additional communication paths, one of which is designated at reference numeral 123. The example communication path 123 transports user data associated with all of the subscribers served via the pedestal 117. Additionally or alternatively, a pedestal (for example, the pedestal 116) may be communicatively coupled back to the SAI 105 via one or more additional fiber optic cable segments 150 thereby creating a fiber optic ring that, for example, encompasses the SAI 105 and the pedestals 115-117. Such fiber optic rings may be used to maintain communication services to the pedestals 115-117 even when a fiber optic cable segment (for example, the segment 120) is severed.

To route data between the fiber optic cable segments 120-123, and between the pedestals 115-117 and the customer premises 110-111, each of the example pedestals 115 and 116 of FIG. 1 implements a distributor 125. As described below in connection with FIG. 2, each of the example distributors 125 of FIG. 1 includes a switch and/or hub 205 (FIG. 2) to repeat user data between and/or amongst any two of the fiber optic cable segments (for example, between the fiber optic cables 120 and 121), and to add and/or drop user data associated with the customer premises that are directly communicatively coupled to the distributor 125.

As described below in connection with FIGS. 4 and 5, the example access network 100 of FIG. 1 can be efficiently deployed and/or implemented in so called "brown field" environments. That is, in environments that already have existing customer premises 110 and 111 such that the installation of the fiber optic cable segments 120-122 could cause property disruptions (for example, torn up streets, yards, etc.), and/or require large expenditures of the time, labor and/or expense. Moreover, the example access network 100 of FIG. 1 can be installed and/or deployed incrementally to only those customer premises 110 and 111 currently requesting high data rate communication services. In particular, by installing fiber optic cable to only those pedestals 115 and 116 associated with customer premises 110 and 111 already requesting high data rate services, the example access network 100 of FIG. 1 can be installed incrementally. By installing the access network 110 incrementally, the upfront costs associated with serving early adopters (for example, the first adopter) of high data rate communication services can be significantly reduced without limiting and/or restricting the ability to subsequently deploy and/or offer high data rate communication services to additional customer premises. The example access network 100 of FIG. 1 may, additionally or alternatively, be efficiently deployed and/or implemented in so called "green field" environments that do not already have existing customer premises.

In contrast, fiber optic based access networks are traditionally deployed in a brown field environment by first installing at least one fiber optic cable between each of the pedestals 115,116 and the SAI 105 regardless of whether any customer premises associated with any of the pedestals 115, 116 have requested high data rate communication services. Thus, considerable expense, time, and/or labor must be expended simply to serve the very first customer. Moreover, to serve that first customer an entire neighborhood and/or street must undergo the disruption caused by the installation of all of the fiber optic cables.

To provide communication services via the fiber optic cable segment 120, the example SAI 105 includes any number and/or type(s) of optical interface modules, one of which is designated at reference numeral 140. The example optical interface module 140 of FIG. 1 receives user data from, for example, a communication server (not shown), forms one or more optical signals that represent the received user data, and provides the one or more optical signals to the pedestals 115 and 116 via the fiber optic cable segment 120. Likewise, user data received from the pedestals 115 and 116 via the fiber optic cable segment 120 is received by the optical interface module 140 and provided to the communication server.

The example pedestals 115 and 116 of FIG. 1 provide communication services to the customer premises 110 and 111 via respective drop wires and/or cables, one of which is designated at reference numeral 135. Example drop wires and/or cables 135 include, but are not limited to, a telephone line, a co-axial cable and/or a fiber optic cable. When a telephone line 135 is used, user data may be transported to and/or from the customer premises 110 using, for example, Ethernet-based and/or digital subscriber line (DSL) based signals implemented by a customer-premises equipment (CPE) device, a customer-premises transceiver, and/or a residential gateway 145 at the customer premises 110 and a CPE communication interface module 210 (FIG. 2) implemented at the distributor 125. In the illustrated example of FIG. 1, a single drop wire 135 is used to transport user data between the pedestal 115 and the customer premise 110. However, multiple drop wires and/or bonding technologies could, additionally or alternatively, be used.

While an example access network 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example distributors 125, the example optical interface module 140 and/or the example transceiver 145 of FIG. 1 may be implemented by hardware, software, firmware and/or any combination of hardware, software and/or firmware. Thus, for example, any of the example distributors 125, the example optical interface module 140 and/or the example transceiver 145 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, an access network may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
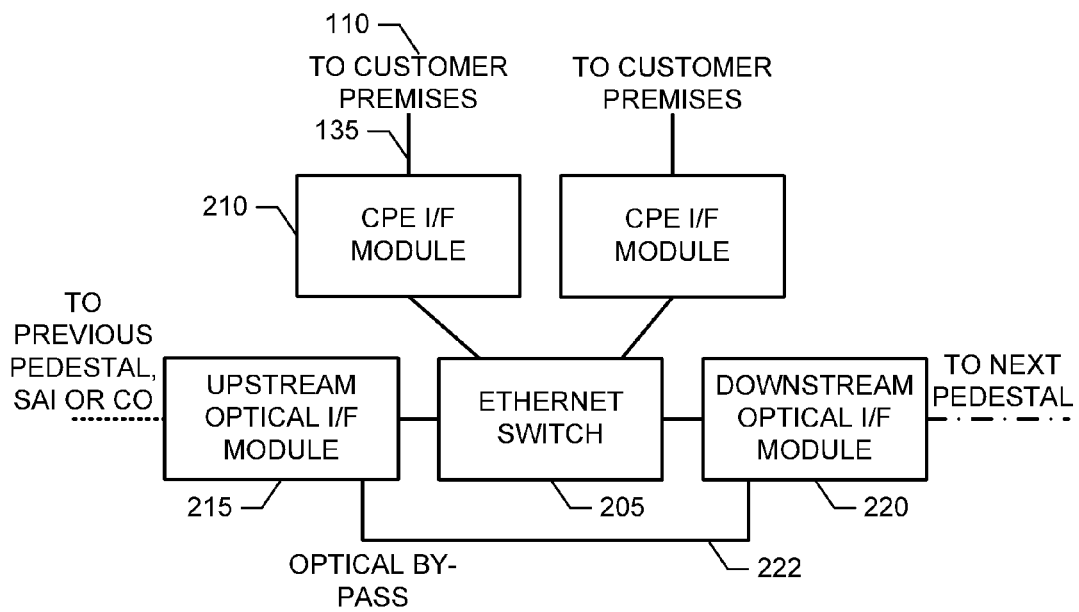
FIG. 2 illustrates an example manner of implementing a distributor for the example distributed DSLAM of FIG. 1.

FIG. 2 illustrates an example manner of implementing the example distributors 125 of FIG. 1. To communicatively couple the distributor 125 to a previous and/or upstream daisy-chained element of the example access network 100 of FIG. 1, the example distributor 125 of FIG. 2 includes any number and/or type(s) of upstream optical interface modules, one of which is designated at reference numeral 215. The previous daisy-chained element can be either (a) the SAI 105 when the pedestal 115-117 that implements the distributor 125 is the closest pedestal 115 to the SAI 105, or (b) another pedestal 115-117. To communicatively couple the distributor 125 to a subsequent, next and/or downstream daisy-chained element of the example access network 100 of FIG. 1, the example distributor 125 of FIG. 2 includes any number and/or type(s) of downstream optical interface modules, one of which is designated at reference numeral 220. An example manner of implementing the example optical interface modules 215 and 220 of FIG. 2 is described below in connection with FIG. 3.

In some examples, the upstream and downstream optical interface modules 215 and 220 of FIG. 2 are communicatively coupled via an optical by-pass 222 that routes one or more optical signals directly between the interface modules 215 and 220. For example, when multiple wavelengths are used on at least one of an optical fiber segment 120-123, a portion of the wavelengths may be bypassed via the example optical bypass 220 while remaining wavelengths are converted to conducted electrical signals to facilitate switching by the example switch 205.

To communicatively couple the distributor 125 to one or more customer premises 110 and 111, the example distributor 125 of FIG. 2 includes a transceiver and/or CPE communication interface module 210 for each customer premises 110 and 111 served by the distributor 125. The example communication interface module 210 of FIG. 2 transports user data to and/or from the example customer premises 110 using a DSL-based signal, an Ethernet-based signal, an Integrated Services Digital Network (ISDN) signal, a plain old telephone service (POTS) signal, a digital signal 1 (DS1) signal, etc. via the drop wire 135. Alternatively, the example communication interface module 210 transports user data to the example customer premises 110 using an optical signal over a fiber optic cable 135, and/or via a wireless communication path implemented in accordance with, for example, an Institute of Electrical and Electronics Engineers (IEEE) 802.16x (a.k.a., WiMax) technology, a PicoCell technology, a wireless access point technology, and/or a FemtoCell technology. The example CPE communication interface module and/or transceiver 210 of FIG. 2 may be implemented, for example, in accordance with any past, present and/or future standard, specification and/or recommendation related to the transmission of communication services via wires, cables or fibers, such as any of the International Telecommunications Union-Telecommunications Sector (ITU-T) G.991.x family of recommendations for symmetric DSL (SDSL), the ITU-T G.992.x family of recommendations for asymmetric DSL (ADSL), the ITU-T G.993.x family of recommendations for very high-speed DSL (VDSL) and VDSL2, the IEEE 802.3x family of standards for Ethernet, the ITU-T G.998.x family of recommendations for bonding of DSL lines, the IEEE 802.3ad standard for link aggregation, the ITU-T G.984 recommendation for Gigabit-capable passive optical networks (GPONs), the IEEE 802.15x family of standards, the IEEE 802.16x family of standards, and/or the IEEE 802.3z 1000BASE-SX, 1000BASE-LX or 1000BASE-BX standards for Ethernet over optical fibers. Additionally or alternatively, the CPE communication interface module 210 implements and/or includes an analog telephone adapter (ATA) to provide a POTS service to a customer premises.

To route data between the example interface modules 210, 215 and 220, the example distributor 125 of FIG. 2 includes the example Ethernet switch and/or Ethernet hub 205. The example Ethernet switch 205 of FIG. 2 implements an add/drop multiplexer for the example distributor 125. In particular, the example Ethernet switch 205 repeats Ethernet frames and/or packets received via the upstream optical interface module 215 to the downstream optical interface module 220, and repeats Ethernet frames and/or packets received via the downstream optical interface module 220 to the upstream optical interface module 215. The example Ethernet switch 205 adds Ethernet frames and/or data received from the customer premises 110 via the example CPE communication interface module 210 to the Ethernet frames and/or data being transmitted via the upstream optical interface module 215 (for example, received from the downstream optical interface module 220). Likewise, when Ethernet data and/or frames that are addressed to the transceiver 145 at the customer premises 110 are received via the upstream optical interface module 215, the example Ethernet switch 205 routes the received Ethernet data and/or frames to the CPE interface module 210 and does not transmit them via the downstream optical interface module 220.

While an example manner of implementing the example distributors 125 of FIG. 1 has been illustrated in FIG. 2, one or more of the elements, processes and/or devices illustrated in FIG. 2 may be combined, divided, re-arranged, omitted, eliminated and/or implemented in any other way. Further, the example Ethernet switch 205, the example interface modules 210, 215 and 220 and/or, more generally, the example distributor 125 of FIG. 2 may be implemented by hardware, software, firmware and/or any combination of hardware, software and/or firmware. Thus, for example, any or all of the example Ethernet switch 205, the example interface modules 210, 215 and 220 and/or, more generally, the example distributor 125 may be implemented by one or more device(s), circuit(s), programmable processor(s), ASIC(s), PLD(s) and/or FPLD(s), etc. Further still, a distributor may include one or more elements, processes and/or devices in addition to, or instead of, those illustrated in FIG. 2, and/or may include more than one of any or all of the illustrated elements, processes and devices. For example, if a distributor is coupled to more than one downstream pedestal, the pedestal-based distributor may implement a downstream optical interface module 220 for each downstream pedestal.

Figure 3:
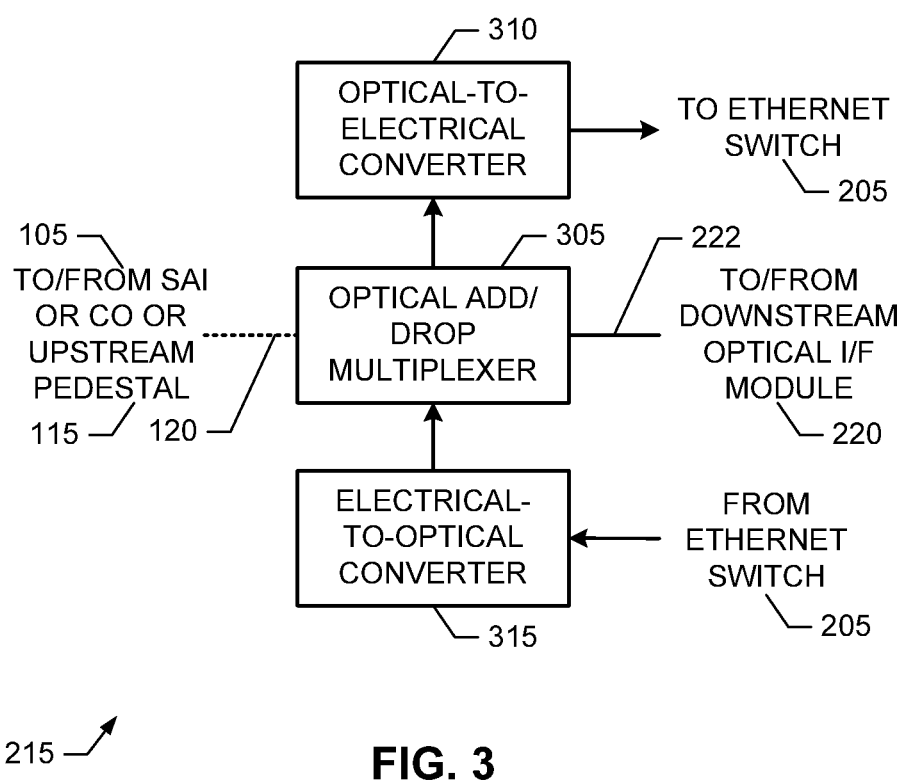
FIG. 3 illustrates an example manner of implementing an upstream communication interface module or a downstream optical communication interface module for the example distributor of FIG. 2.

FIG. 3 illustrates an example manner of implementing the optical interface modules 215 and 220 of FIG. 2. While the example device of FIG. 3 may be used to implement either of the optical interface modules 215 and 220, for ease of discussion, the example device of FIG. 3 will be referred to as the optical interface module 215. To form, generate, create, transmit, receive, decode, and/or transport optical signals via the fiber optic cable segment 120, the example upstream communication interface module 215 of FIG. 3 implements any type of optical add drop multiplexer 305. The example optical add/drop multiplexer (OADM) 305 of FIG. 3 routes optical signals received via the example fiber optic cable segment 120 (FIG. 1) to an optical-to-electrical converter 310 and/or to the example optical bypass 222 (FIG. 2). Likewise, the example OADM 305 routes optical signals received from an electrical-to-optical converter 315 and/or from the example optical bypass 222 to the fiber optic cable segment 120. Where optical signals are routed to and/or received from within the example optical interface module 215 depends on, for example, how optical signals are utilized, allocated and/or provisioned within the example access network 100. For example, if a single wavelength fiber optic cable 120 is used, all optical signals received via the fiber optic cable 120 could converted by the example optical-to-electrical converter 310 and the OADM 305 could be eliminated. Additionally or alternatively, if a multi-wavelength fiber optic cable 120 is used, one or more wavelengths could be converted via the example optical-to-electrical converter 310 while additional wavelengths are bypassed via the optical bypass 222.

The example optical-to-electrical converter 310 of FIG. 3 converts optical signals provided by the example OADM 305 into an electrical form suitable for switching the example switch 205 (FIG. 2). Likewise, the example electrical-to-optical converter 315 of FIG. 3 converts electrical signals received from the switch 205 into optical signals suitable for transport via the fiber optic cable segment 120.

While an example manner of implementing the example optical interface modules 215 and 220 of FIG. 2 has been illustrated in FIG. 3, one or more of the elements, processes and/or devices illustrated in FIG. 3 may be combined, divided, re-arranged, omitted, eliminated and/or implemented in any other way. Further, the example OADM 305 and/or the example converters 310 and 315 of FIG. 3 may be implemented by hardware, software, firmware and/or any combination of hardware, software and/or firmware. Thus, for example, any or all of the example OADM 305 and/or the example converters 310 and 315 may be implemented by one or more device(s), circuit(s), programmable processor(s), ASIC(s), PLD(s) and/or FPLD(s), etc. Further still, a communication interface module may include one or more elements, processes and/or devices in addition to, or instead of, those illustrated in FIG. 3, and/or may include more than one of any or all of the illustrated elements, processes and devices.

Figure 4:
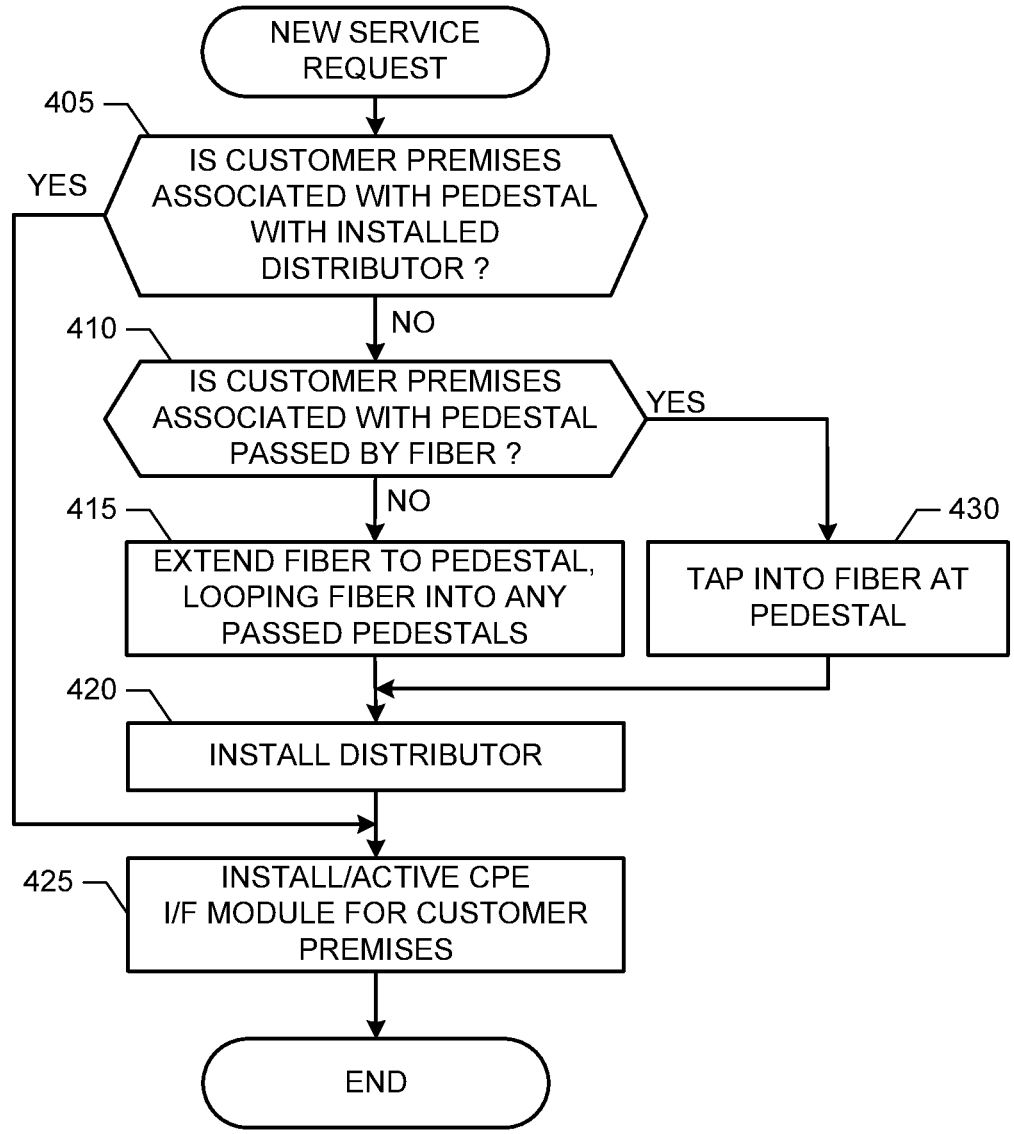
FIG. 4 illustrates an example process that may be carried out to install a fiber optic based access network.

FIG. 4 illustrates a flowchart representative of example processes that may be carried out to deploy a fiber optic based access network in a brown field environment. The example process may also be carried out to deploy a fiber optic based access network in a green field environment. The order of execution of the example blocks of FIG. 4 may be changed, and/or one or more of the blocks described may be changed, eliminated, sub-divided, or combined. Additionally, any or all of the example process of FIG. 4 may be carried out sequentially and/or carried out in parallel by, for example, different installers and/or technicians. For ease of understanding, the example process of FIG. 4 will be described with reference to the illustrated examples of FIGS. 5A-5D.

The example process of FIG. 4 begins when a customer premises 505 (FIG. 5A) requests a high data rate communication service requiring a fiber optic based access network to a pedestal 510 associated with the customer premises 505. If the pedestal 510 does not already have an installed distributor 125 (block 405), the example process determines whether the pedestal 510 is already passed with an existing fiber optic cable segment (block 410).

Figure 5A:
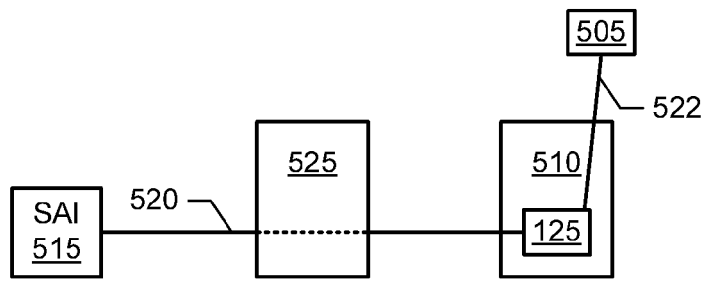
FIGS. 5A-5D illustrate example fiber optic based access networks that may result from the example process of FIG. 4.

If the pedestal 510 is not passed by an existing fiber optic cable (block 410), a fiber optic cable segment 520 is installed between the pedestal 510 and an SAI 515 or to the closest upstream pedestal to which a fiber optic cable segment has already been extended (block 415). As illustrated in FIG. 5A, because the fiber optic cable segment 520 passes a second pedestal 525, the fiber optic cable segment 520 is looped into and/or passed through the pedestal 525. A distributor 125 is installed at the pedestal 510 (block 420). A CPE communication interface module 210 (FIG. 2) is installed and/or activated at the distributor 125 for the customer premises 505 using either an existing and/or newly installed drop cable 522 (FIG. 1) (block 425). Control then exits from the example process of FIG. 4.

Figure 5B:
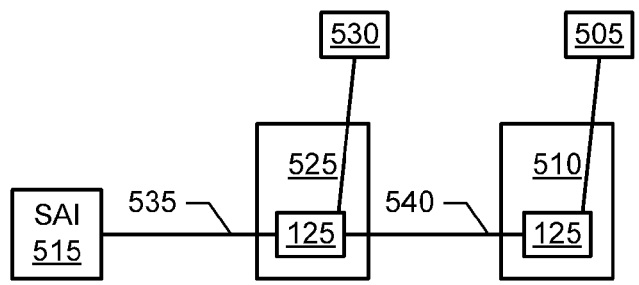
Figure 5C:
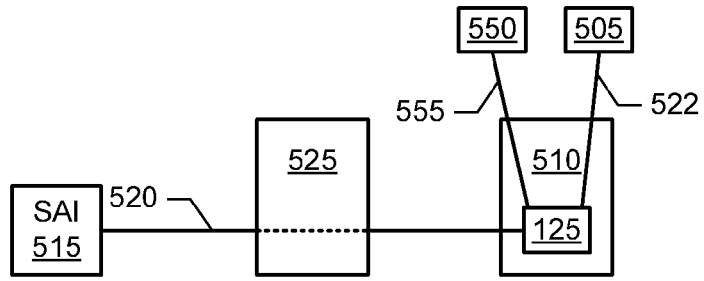

Returning to block 410, if a customer premises 530 (FIG. 5B) associated with the example pedestal 525 that is already passed by the fiber optic cable segment 520 requests a high data rate communication service requiring a fiber optic based access network to the pedestal 525 (block 410), the fiber optic cable segment 520 is tapped into and/or split into two fiber optic cable segments 535 and 540 (block 430). A distributor 125 is then installed at the pedestal 525 between the fiber optic cable segments 535 and 540, as shown in FIG. 5B (block 420). In some examples, when the fiber optic cable segment 520 is looped into and/or passed through the example pedestal 525 (see FIG. 5A), the example fiber optic cable segment 520 is cut at the pedestal 525 and optical connectors are installed. The optical connectors are then attached to a pass-through and/or passive optical device to construct the example topology of FIG. 5A. As illustrated in FIG. 5B, such pre-installed connectors can facilitate the subsequent installation of a distributor 125 at the pedestal 525.

Returning to block 405, if a customer premises 550 (FIG. 5C) associated with the example pedestal 510 already having an installed distributor 125 requests a high data rate communication service requiring a fiber optic based access network to the pedestal 510 (block 405), a CPE communication interface module 210 (FIG. 2) is installed and/or activated at the distributor 125 for the customer premises 550 using either an existing and/or newly installed drop cable 555 (FIG. 1) (block 425). Control then exits from the example process of FIG. 4.

Figure 5D:
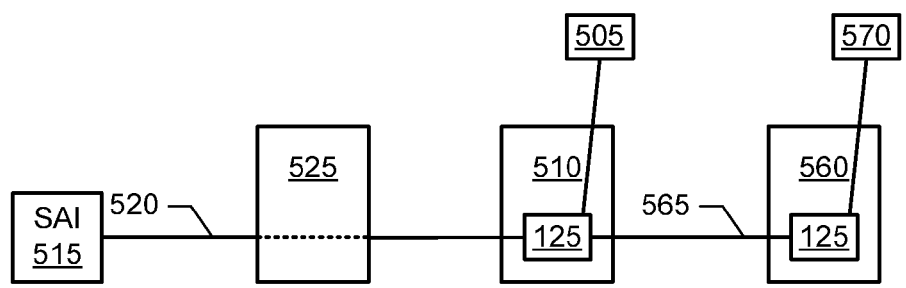

As illustrated in FIG. 5D, if a customer premises 570 associated with a pedestal 560 not having a distributor 125 (block 405) and not already served by a fiber optic cable (block 410) requests a high data rate communication service requiring a fiber optic based access network to the pedestal 560, a fiber optic cable segment 565 is installed between the pedestal 560 and the closest upstream pedestal 510 to which a fiber optic cable segment has already been extended (block 415), and a distributor installed at the pedestal 560. If the fiber optic cable segment 565 passes another pedestal, the fiber optic cable segment 565 would be looped into and/or passed through the passed pedestal.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to deploy a fiber optic based access network, the method comprising:

installing a first fiber optic cable segment between an optical access head-end and a first pedestal associated with a first customer premises in response to receiving a request for a first communication service, the first fiber optic cable segment routed through a second pedestal geographically located between the optical access head-end and the first pedestal, the second pedestal to provide a second communication service to a second customer premises; and installing a first distributor at the first pedestal to route first data between the first fiber optic cable segment and the first customer premises to provide the first communication service.

2. The method of claim 1, further comprising installing a first drop cable segment between the first pedestal and the first customer premises to route the first data to the first customer premises.

3. The method of claim 2, further comprising installing a second drop cable segment between the first pedestal and a third customer premises to route second data to the third customer premises.

4. The method of claim 1, further comprising installing a second fiber optic cable segment between the first pedestal and the optical access head-end, the second fiber optic cable segment routed through a third pedestal geographically located between the optical access head-end and the first pedestal.

5. The method of claim 4, further comprising routing the first data between the second fiber optic cable segment and the first customer premises via the first distributor to provide the first communication service when the first fiber optic cable segment is severed.

\* \* \* \* \*